Figure 1:
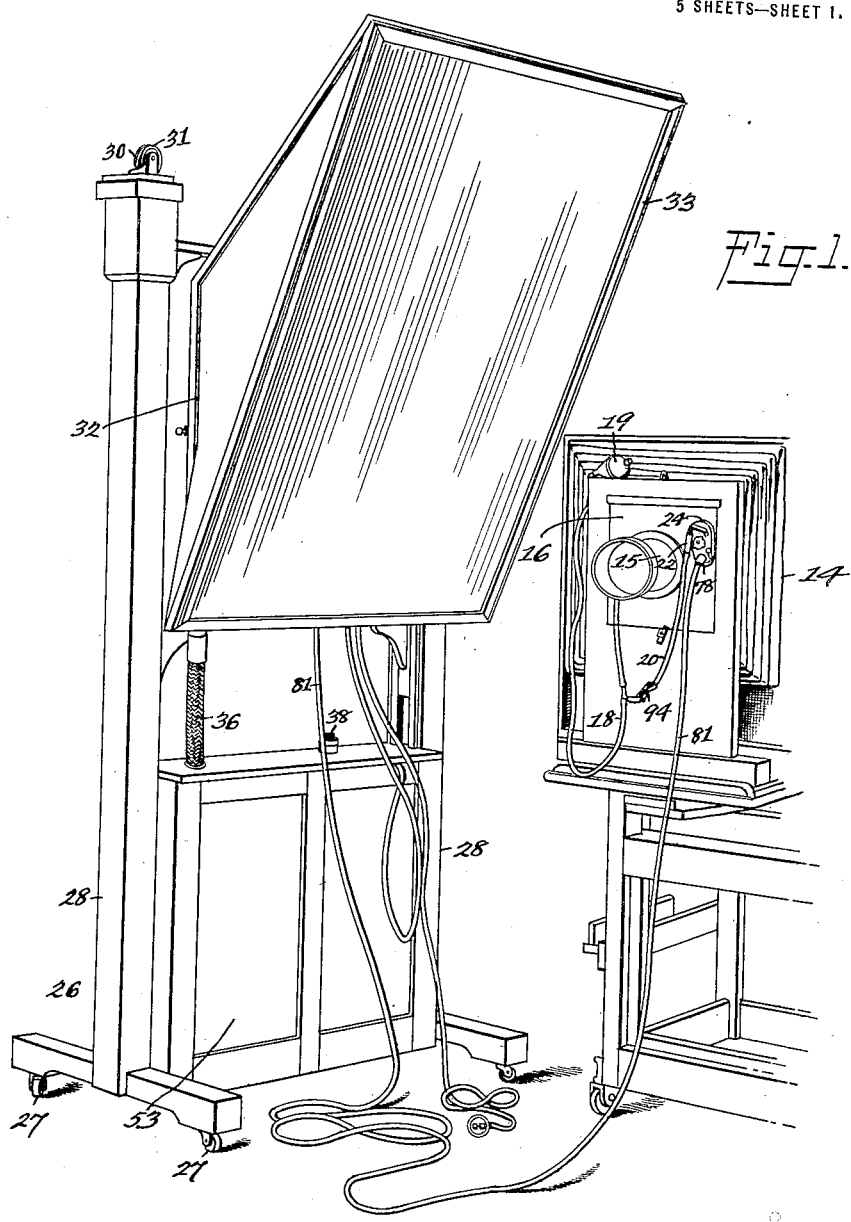

J. L. COURSON.
FLASH LIGHT APPARATUS.
APPLICATION FILED FEB. 6, 1915.

1,159,179.

Patented Nov. 2, 1915.
5 SHEETS—SHEET 1.

WITNESSES
William P. Goebel,
J. E. Larsen

INVENTOR
James L. Courson
BY Munn & Co
ATTORNEYS

J. L. COURSON.
FLASH LIGHT APPARATUS.
APPLICATION FILED FEB. 6, 1915.

1,159,179.

Patented Nov. 2, 1915.
5 SHEETS—SHEET 2.

WITNESSES
William G. Goebel.
J. C. Larsen

INVENTOR
James L. Courson
BY Munn & Co.
ATTORNEYS

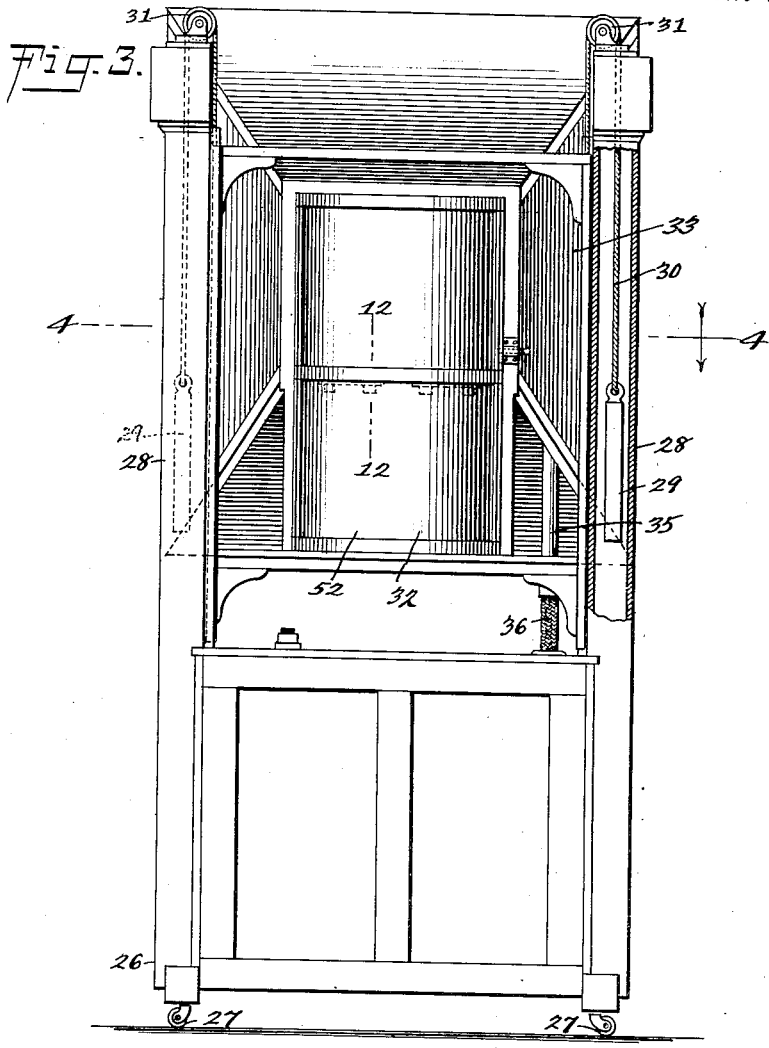
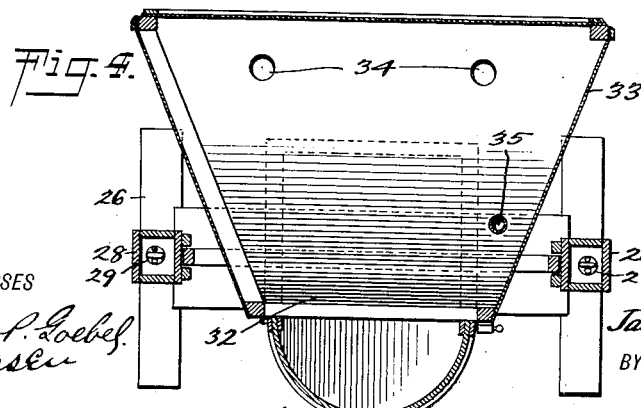

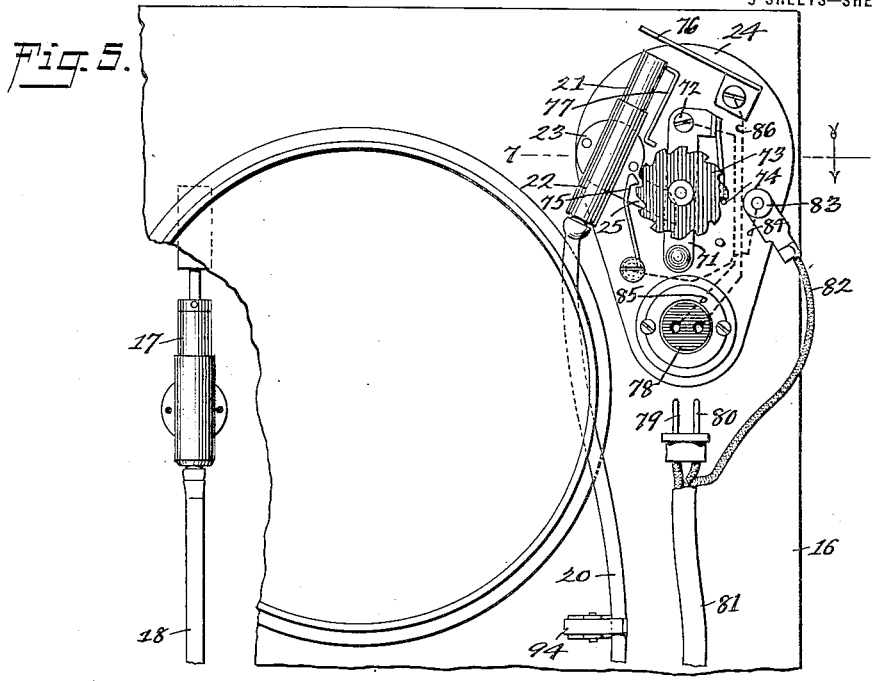

J. L. COURSON.
FLASH LIGHT APPARATUS.
APPLICATION FILED FEB. 6, 1915.

1,159,179.

Patented Nov. 2, 1915.
5 SHEETS—SHEET 5.

WITNESSES
William P. Goebel
J. C. Larsen

INVENTOR
James L. Courson
BY Munn & Co.
ATTORNEYS

UNITED STATES PATENT OFFICE.

JAMES L. COURSON, OF BARBERTON, OHIO, ASSIGNOR OF ONE-HALF TO THOMAS D. EVANS, OF BARBERTON, OHIO.

FLASH-LIGHT APPARATUS.

1,159,179.  Specification of Letters Patent.  Patented Nov. 2, 1915.

Application filed February 6, 1915. Serial No. 6,662.

*To all whom it may concern:*

Be it known that I, JAMES L. COURSON, a citizen of the United States, and a resident of Barberton, in the county of Summit and State of Ohio, have invented certain new and useful Improvements in Flash-Light Apparatus, of which the following is a specification.

My invention relates to photographers' flash light apparatus, and is an improvement over the forms shown and described in Letters Patent of the United States, Nos. 1,063,778 and 1,080,750, issued to me on June 3, 1913 and Dec. 9, 1913, respectively.

One of the main objects of the present apparatus is to provide means for simultaneously actuating the shutter of a camera and the flash light apparatus by means of the ordinary shutter actuating means, such as the air bulb.

Another object is to provide means for electrically igniting each of a plurality of charges successively, one charge for each shutter actuation, and to provide means electrically energized to carry an unexploded charge into igniting position after the previous charge has been ignited.

Another object is to actuate the electrically energized members through a three-wire system.

Another object is to provide means for preventing the electrical actuation of the parts in the shutter actuation when desired, as in daylight exposures.

Another object is to provide means for throwing the flash apparatus entirely out of operation.

Another object is to provide means for throwing the mechanism which successively feeds the charges to the ignition point out of operation.

Another object is to provide means for preventing the spreading of the smoke or other products of combustion of the flash powder into or through a room.

Another object is to provide means for vertically adjusting the apparatus.

Another object is to provide means for directing the light from the flash to a desired point.

Another object is to provide means which render the apparatus immune against accidental or premature electrical ignition of a charge while re-loading the magazine; and other objects are to provide such apparatus which is simple in construction and use, well adapted for the purpose for which it is designed, and comparatively inexpensive.

My invention is fully described in the following specification, of which the accompanying drawings form a part, in which like reference characters are used to designate like parts in each of the views, and in which:—

Figure 2:
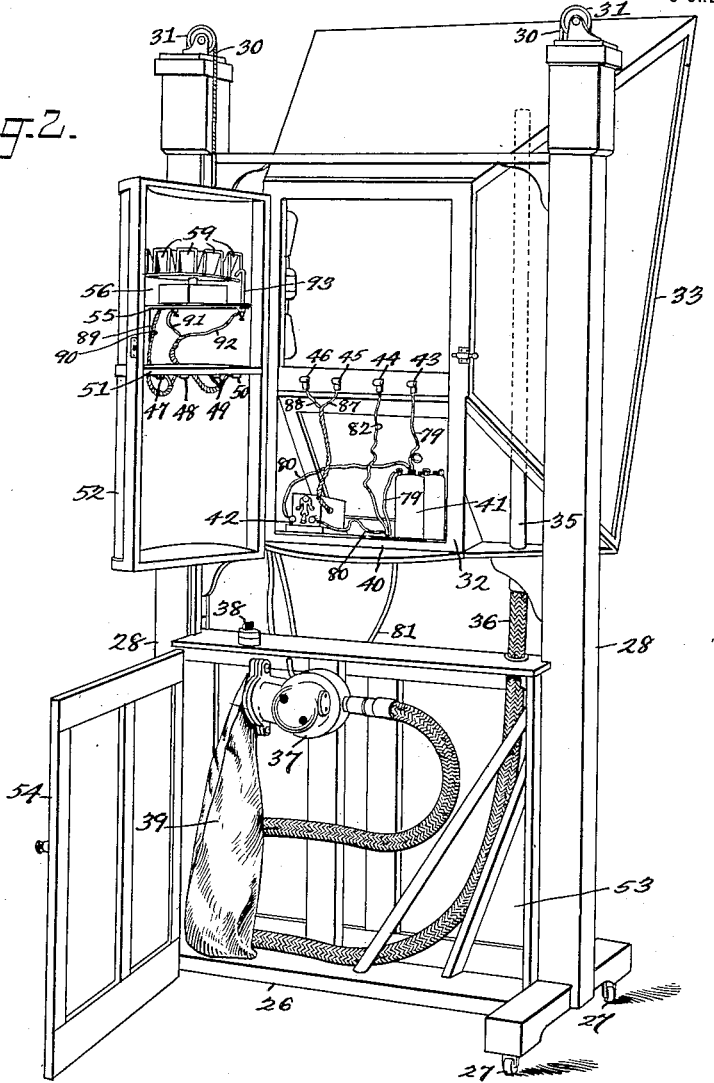
Figure 12:
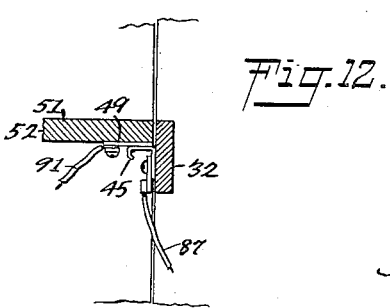
Figure 9:
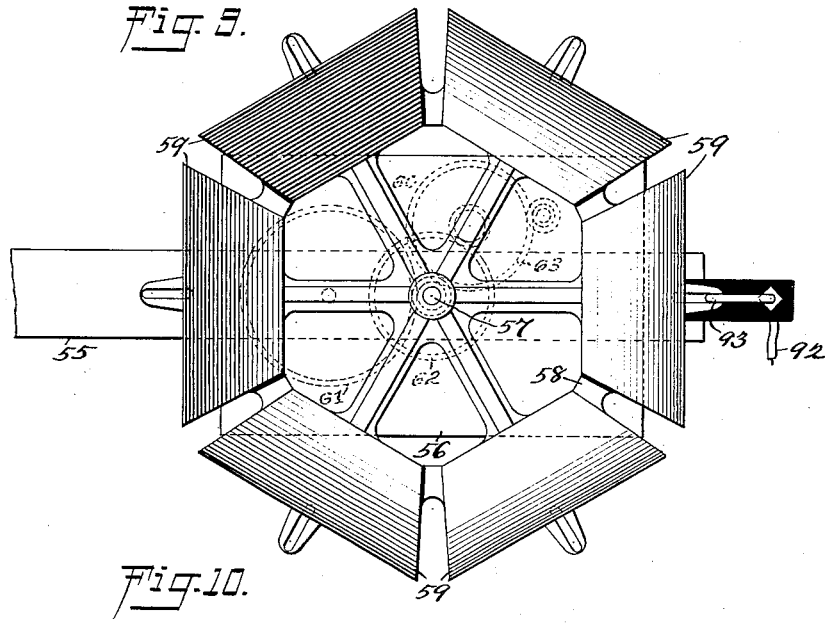
Figure 10:
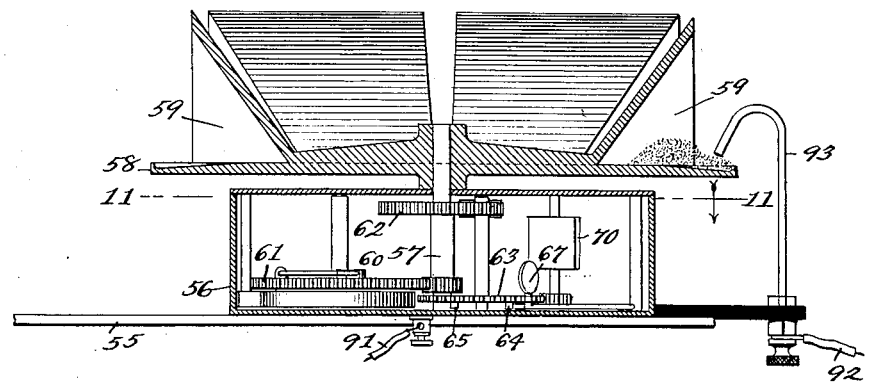
Figure 11:
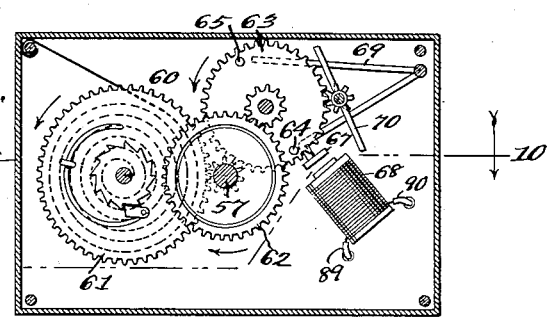

Figure 1 is a perspective view of my apparatus connected with a studio camera; Fig. 2 is a perspective, rear, view thereof, with the cabinet door open to show the interior, and with the smoke removing means exposed to view; Fig. 3 is a rear elevation with the doors closed; Fig. 4 is a section taken on the line 4—4 of Fig. 3; Fig. 5 is an enlarged, detached, view of the camera attachment, with the parts in operative positions; Fig. 6 is a view of the camera attachment removed from the front plate and with the parts in a different position; Fig. 7 is a section taken on the line 7—7 of Fig. 5; Fig. 8 is a section taken on the line 8—8 of Fig. 6; Fig. 9 is an enlarged, detached, plan, view of the magazine; Fig. 10 is a vertical section thereof on the line 10—10 of Fig. 11; Fig. 11 is a section taken on the line 11—11 of Fig. 10; Fig. 12 is a section taken on the line 12—12 of Fig. 3; and Fig. 13 is a diagrammatic view of the electrical arrangement.

In the drawings forming a part of this application I have shown a camera 14 having the lens mount 15 provided with the usual lenses and shutter, not shown, arranged on the front plate 16, said shutter being adapted to be actuated by the dash-pot plunger 17 through the medium of the conventional tube 18 and bulb 19, all in the usual manner, said tube being branched to provide a tube 20 for actuating a similar dash-pot plunger 21 in a dash-pot 22 mounted on a conductive plate 23 in turn mounted upon a non-conductive base 24, said plate having an extension 25 for a purpose later described.

At 26 I have shown a frame for the flash apparatus movable on casters 27, said frame having hollow uprights 28 in which are counter-weights 29 carried on cables 30 passed over pulleys 31 and secured to a cabinet 32, and it will be seen that said cabinet may be vertically adjusted with respect to the uprights 28. The cabinet 32 carries a forwardly directed, light projecting, bell 33, the mouth of which may be covered by a sheet of suitable material of a transparent or translucent property and, preferably, airtight; I provide air-holes 34 in the bottom of said bell, Fig. 4, and also a vertically arranged pipe 35 extended to a point adjacent the top of said bell and which is connected with a flexible hose 36, Fig. 2, leading to an electrically driven suction pump 37 of any suitable design; when a switch 38 is closed the smoke resulting from the explosion of a charge of flash powder is adapted to be drawn into a bag 39, and I may also remove the pipe 35 from the bell and use it as a vacuum cleaner for the interior of the cabinet, this structure not being shown in detail as, specifically, it forms no part of my invention.

Beneath the rear, contracted, opening in the bell is a shelf 40, Fig. 2, for a battery of dry-cells 41 and a spark-coil 42, and I also provide four spring contacts 43, 44, 45, and 46 thereover which are adapted to form electrical connections with similar contacts 47, 48, 49, and 50, respectively, carried by a shelf 51 in a segmentally formed door 52 hinged to the cabinet 32, and which door is adapted to close the entire rear side of the cabinet, and I may also provide a box 53 and door 54 therefor to inclose the smoke exhaust apparatus.

Above the shelf 51 in the door 52 is a supplemental shelf 55 which carries a casing 56 having a central shaft 57 rotatably mounted therein and projected upwardly therethrough, and carrying a plate 58 therewith, Fig. 10, provided with a plurality of pockets 59, Fig. 9, adapted to receive, each, a charge of flash powder, said plate 58 and shaft being of conductive material. The shaft 57 is connected, through a train of gears 60, with a spring actuated gear 61, and I gear the gear-wheel 62 on said shaft with a gear-wheel 63 carrying two diametrically arranged pins 64 and 65; adjacent said gear 63 is an armature 67 normally in the path of movement of the pins 64 or 65 but adapted to be moved therefrom by means of a magnet 68 when the latter is energized as will be later explained and thus permit the revolution of the magazine plate 58; however, I may also provide an arm 69 adapted to be struck by the respective pin to again move the armature into pin engaging position after the magnet has been deënergized, this being calculated, as will be later seen, to permit a revolution of the gear 63 through an arc of 180 degrees of a circle and thus, by its connection with the gear 62 on the shaft 57, permit the latter gear and the magazine plate 58 to revolve through an arc of a circle equal to the distance between the median lines of the pockets 59 in contiguous relationship, this being 60 degrees in the present showing; I may also provide a fan controller 70 to prevent too free revolution of these parts.

Referring to Figs. 5 and 6, the base 24 carries a switch 71 pivoted thereto at 72 and having a ratchet wheel 73 rotatable thereon and prevented from free rotation by means of a pawl 74; secured to the base is a finger 75 which is normally out of contact with the ratchet 73 but adapted to touch the inclines of the successive teeth on said ratchet when the latter is rotated and thus make an electrical contact through the ratchet and switch. The under side of said switch is adapted to make a slidable electrical contact with the extension 25 on the conductive plate 23 when said switch is in the position shown in Fig. 5, but to break such contact when in the position shown in Fig. 6. The plunger 21 on its outward movement is adapted to impinge on a spring contact 76, and said plunger carries an arm 77 adapted to rotate the ratchet 73 the distance of one tooth on the inward plunger movement. At 78 I have shown a two-wire socket adapted to receive the terminals of two conductors 79 and 80 in a three-wire cable 81 and the third conductor, 82, of which is detachably connected with a binding post 83 in turn connected, by means of a conductor 84, with the spring finger 75. The switch 71 is connected, by means of a conductor 85, with the socketed terminal of the conductor 79, and the spring contact 76 is connected, by means of a conductor 86, with the socketed terminal of the conductor 80; it will be seen from the above that the electrical connections may be entirely broken by removing the terminals from the socket or by throwing the switch 71 into open position. The conductor 79 is connected directly with the battery 41 and, thence, to the spring contact 43; the conductor 80 passes directly to the spark-coil 42 and, thence, to the battery 41; and the conductor 82 passes directly to the spring contact 44. The spark-coil is connected, by means of conductors 87 and 88, with the spring contacts 45 and 46. The door contacts 47 and 48 are connected, by means of conductors 89 and 90, with the solenoid 68, and the door contacts 49 and 50 are connected, by means of conductors 91 and 92, with the gear casing 56 and with a fixed electrode 93, respectively, Fig. 10, the latter being held in the plate 56 but insulated therefrom, and being extended over said plate and over the charge of flash powder in each of the pockets as they are successively brought into this position. When the door 52 is opened to enable an operator to recharge the magazine, it will be seen that the contacts at 43—47, 44—48, 45—49, and 46—50, are broken, thus preventing premature sparking and explosion, these connections being again closed, as shown in Fig. 12, when the door is closed.

With the switch 71 in the closed position shown in Fig. 5, and the clamp 94 released from the air tube branch, if the bulb 19 be compressed to actuate the camera shutter the plunger 21 is forced outwardly to make an electrical connection with the spring contact 76, and an electrical circuit is closed through said plunger 21, contact 76, conductors 86 and 80, coil-box 42, battery 41, conductors 79 and 85, switch 71, extension 25 of the plate 23, dash-pot 22 and back to plunger 21. This circuit through the primary winding of the spark-coil 42 induces a current through the conductors 91 and 92, to the plate 58 and electrode 93, and a spark is produced across the gap between the plate and electrode to ignite the charge of powder at the instant that the camera shutter is actuated, and the exposure is made. This shutter actuation may be either time or bulb, but usually the latter and, when the pressure on the bulb is released the plunger 21 resumes its normal position and the electrical circuit therethrough is broken. On the backward plunger movement the arm 77 thereon engages with the ratchet 73 and rotates the same the distance of one tooth, thus bringing the finger 75 into electrical contact with the periphery of said ratchet; an electrical circuit is thus closed through said finger and ratchet, switch 71, conductors 85 and 79, battery 41, solenoid 68, conductor 82, binding post 83, conductor 84, and finger 75. The solenoid thus being energized, the armature 67 is drawn out of the path of the pin 64 and the gear 63 revolves until it strikes against the arm 69 and moves the armature 67 back to normal position to engage the pin 65 and stop further revolution of the gear 63 after it has traveled through an arc of 180 degrees of a circle, with the fan 70 preventing too rapid movement; in this gear revolution the plate 58 is revolved to bring another pocket 59 into the position of the electrode 93, ready for exploding the charge therein, and in the return of the armature the parts are locked in position ready for another exposure. When the plunger 21 has reached its extreme inward position, the finger 75 is again free from the ratchet 73, the circuit therethrough being thus broken, and the armature 67 is not attracted by the solenoid until this circuit is again closed by another actuation of the plunger 21 and ratchet 73. It will thus be seen that the shutter opening and the flash powder explosion are in absolute synchrony, and actuated directly by the bulb 19, or equivalent; the magazine is provided with a plurality of charges to avoid any loss of time in re-charging between camera exposures, and is positively locked until the plunger 21 returns to normal position, and during which return the magazine is actuated to bring another charge of powder into igniting position; no premature spark can be occasioned until the plunger 21 completes the circuit through the spark-coil, nor can any spark occur while the cabinet door is opened for re-charging the magazine or for any other reason; the exhaust fan draws all the smoke out of the cabinet and air is admitted to the cabinet, or rather the bell thereof, to replace the polluted air exhausted; the bell may be vertically adjusted to direct the flash directly upon the subject being photographed, and the frame itself may be swung about to adjust the device in a horizontal plane. It will also be seen that the device is applicable to any camera employing the air actuated plunger 21, and without any alteration in the camera whatever; the camera may be used without the flash light apparatus without the necessity for removing the latter therefrom; the bell carrying frame may be removed from the camera location at will without removing the circuit closer on the front plate of the camera; and the apparatus may be rendered inoperative by either the switch 71 or the clamp 84.

While I have shown certain details of construction, I do not limit myself thereto, but may make changes thereover, within the scope of the following claims, without departing from the spirit of my invention or sacrificing its advantages.

Having fully described my invention, what I claim as new, and desire to secure by Letters Patent, is:—

1. The combination with a camera provided with a shutter and manual means for operating the same; of a flash-light apparatus, comprising a magazine provided with a plurality of pockets having, each, a charge of flash powder therein, means for igniting a charge in synchrony with the actuation of said shutter operating means, and means for carrying a new charge into igniting position upon the return of said operating means to normal position.

2. The combination with a camera provided with a shutter and manual means for operating the same; of a flash-light apparatus, comprising a magazine provided with a plurality of pockets having, each, a charge of flash powder therein, a plunger, means actuated thereby for igniting a charge, a bulb and tube for operating said shutter and said plunger in synchrony, and means for carrying a new charge into igniting position upon release of said bulb and the return of said plunger to normal position.

3. The combination with a camera provided with a shutter and manual means for operating the same; of a flash-light apparatus, comprising a magazine provided with a plurality of pockets having, each, a charge of flash powder therein, a spark-coil, an electric circuit adapted to be closed through said coil to ignite a charge, means operable by said shutter operating means for closing said circuit, and means for carrying a new charge into igniting position upon the release of said shutter operating means.

4. The combination with a camera provided with a shutter and manual means for operating the same; of a flash-light apparatus, comprising a magazine provided with a plurality of pockets having, each, a charge of flash powder therein, means in operable connection with said manual shutter operating means for igniting a charge in synchrony with the shutter operation, a solenoid, an electric circuit therethrough, and means for closing said circuit upon the release of said manual shutter operating means, whereby a new charge is carried into igniting position.

5. The combination with a camera provided with a shutter and manual means for operating the same; of a flash light apparatus, comprising a magazine provided with a plurality of pockets adapted, each, to receive a charge of flash powder, each of said pockets consisting of an upwardly and outwardly inclined rear wall, outwardly divergent end walls, and a floor projecting outwardly beyond said walls, an electrode in fixed position extended over the outer edges of the floors of said pockets, means for igniting a charge in synchrony with the actuation of said shutter operating means through said electrodes, and means for carrying a new charge into igniting position upon the return of said operating means to normal position.

6. The combination with a camera provided with a shutter and manual means for operating the same; of a flash light apparatus, comprising a magazine provided with a plurality of pockets, adapted, each, to receive a charge of flash powder therein, means for igniting a charge in synchrony with the operation of said shutter operating means, comprising a non-conductive base, a pneumatic plunger in operative connection with said shutter operating means, a spark device in the position of said magazine, an open electrical circuit through said spark device, said circuit being adapted to be closed by said plunger when actuated in the shutter actuation, means for revolving said magazine, a lock for normally preventing the actuation thereof, an electrical circuit operatively connected with said lock, and means for closing said last-named electrical circuit in the retraction of said plunger to release said lock, and thereby permit said magazine to revolve a predetermined distance.

7. The combination with a camera provided with a shutter and manual means for operating the same, of a magazine provided with a plurality of pockets adapted, each, to receive a charge of flash powder, a pneumatic plunger in operative connection with said shutter operating means, means for igniting a charge in the outward plunger movement in the operation of said shutter operating means, means for revolving said magazine step by step for a predetermined distance, a lock preventing such revolution, said means actuated in the backward movement of said plunger for releasing said lock to permit a new charge to be carried into igniting position.

In testimony whereof I have signed my name to this specification in the presence of two subscribing witnesses.

JAMES L. COURSON.

Witnesses:
  W. A. MORTON,
  BESS MORTON.